(12) United States Patent
Tanioka et al.

(10) Patent No.: US 7,073,796 B2
(45) Date of Patent: Jul. 11, 2006

(54) METAL PACKING

(75) Inventors: Tadateru Tanioka, Hyogo (JP); Mituo Ukai, Kyoto (JP); Tadao Yashiki, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/399,410

(22) PCT Filed: Jun. 6, 2002

(86) PCT No.: PCT/JP02/05600

§ 371 (c)(1),
(2), (4) Date: Apr. 23, 2003

(87) PCT Pub. No.: WO02/101266

PCT Pub. Date: Dec. 19, 2002

(65) Prior Publication Data

US 2004/0041353 A1    Mar. 4, 2004

(30) Foreign Application Priority Data

Jun. 7, 2001    (JP) .............................. 2001-172837

(51) Int. Cl.
  *F16L 17/00*    (2006.01)
(52) U.S. Cl. ...................... 277/626; 277/616; 277/644; 277/647; 285/111; 285/23
(58) Field of Classification Search ................ 277/626, 277/644, 647, 650, 616; 285/110, 111, 23
See application file for complete search history.

(56) References Cited

U.S. PATENT DOCUMENTS

| 1,866,160 | A | * | 7/1932 | Griswold, Jr. | ............... | 277/340 |
| 2,211,983 | A | * | 8/1940 | Parris | .......................... | 285/110 |
| 3,307,861 | A | * | 3/1967 | Adam et al. | .............. | 285/334.2 |
| 3,713,660 | A | * | 1/1973 | Luthe | .......................... | 277/644 |
| 4,088,327 | A | * | 5/1978 | Bachle | ........................ | 277/637 |
| 4,434,909 | A | * | 3/1984 | Ott | ............................. | 220/316 |
| 4,877,272 | A | * | 10/1989 | Chevallier et al. | .......... | 285/111 |
| 4,998,740 | A | * | 3/1991 | Tellier | ......................... | 277/362 |
| 5,342,096 | A | * | 8/1994 | Bachle et al. | ................. | 285/23 |
| 5,354,072 | A | * | 10/1994 | Nicholson | ................... | 277/647 |
| 6,502,833 | B1 | * | 1/2003 | Shibata et al. | .............. | 277/647 |

FOREIGN PATENT DOCUMENTS

| JP | 9-5201 | 4/1934 |
| JP | 47-10310 | 5/1972 |
| JP | 3-113176 | 5/1991 |
| JP | 07-055004 | 3/1995 |
| JP | 11-101346 | 4/1999 |

* cited by examiner

*Primary Examiner*—Alison K. Pickard
(74) *Attorney, Agent, or Firm*—Oblon, Spivak, McClelland, Maier & Neustadt, P.C.

(57) ABSTRACT

A metallic packing is used to seal a connection between steam pipes. The metallic packing has an annular basement. This annular basement has an opening that joins the holes of the steam pipes. Two annular lips project from an inner circumference of the annular basement towards a central axis of the opening. Each annular lip steps away form the other lip, and the distance between free ends of the lips is longer than the width of the annular basement along the direction of the central axis.

5 Claims, 6 Drawing Sheets

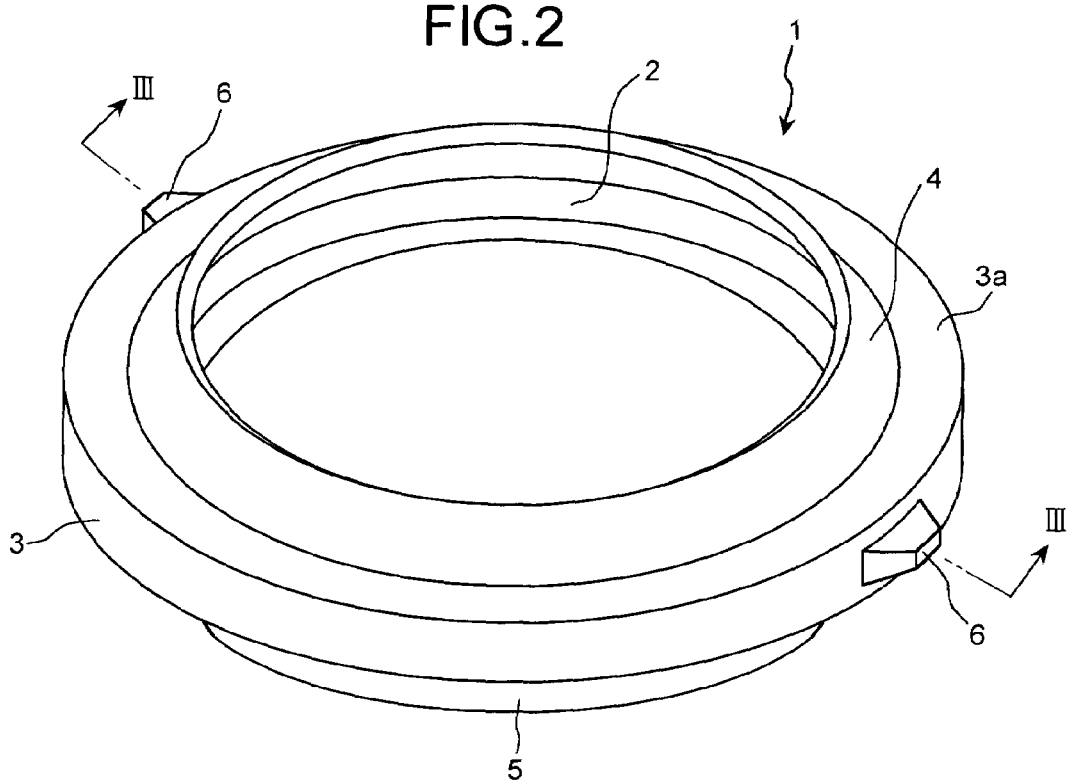
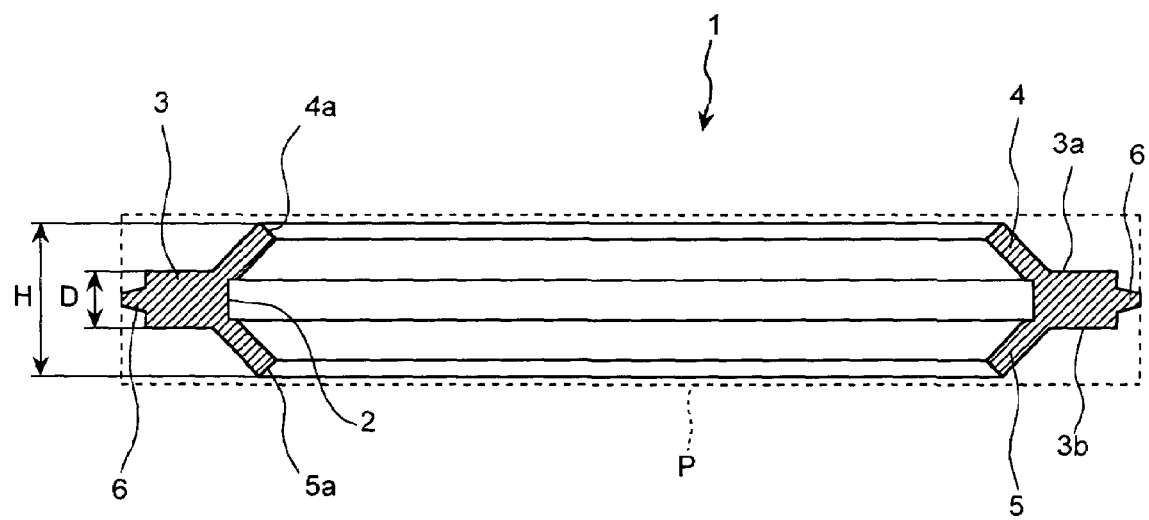

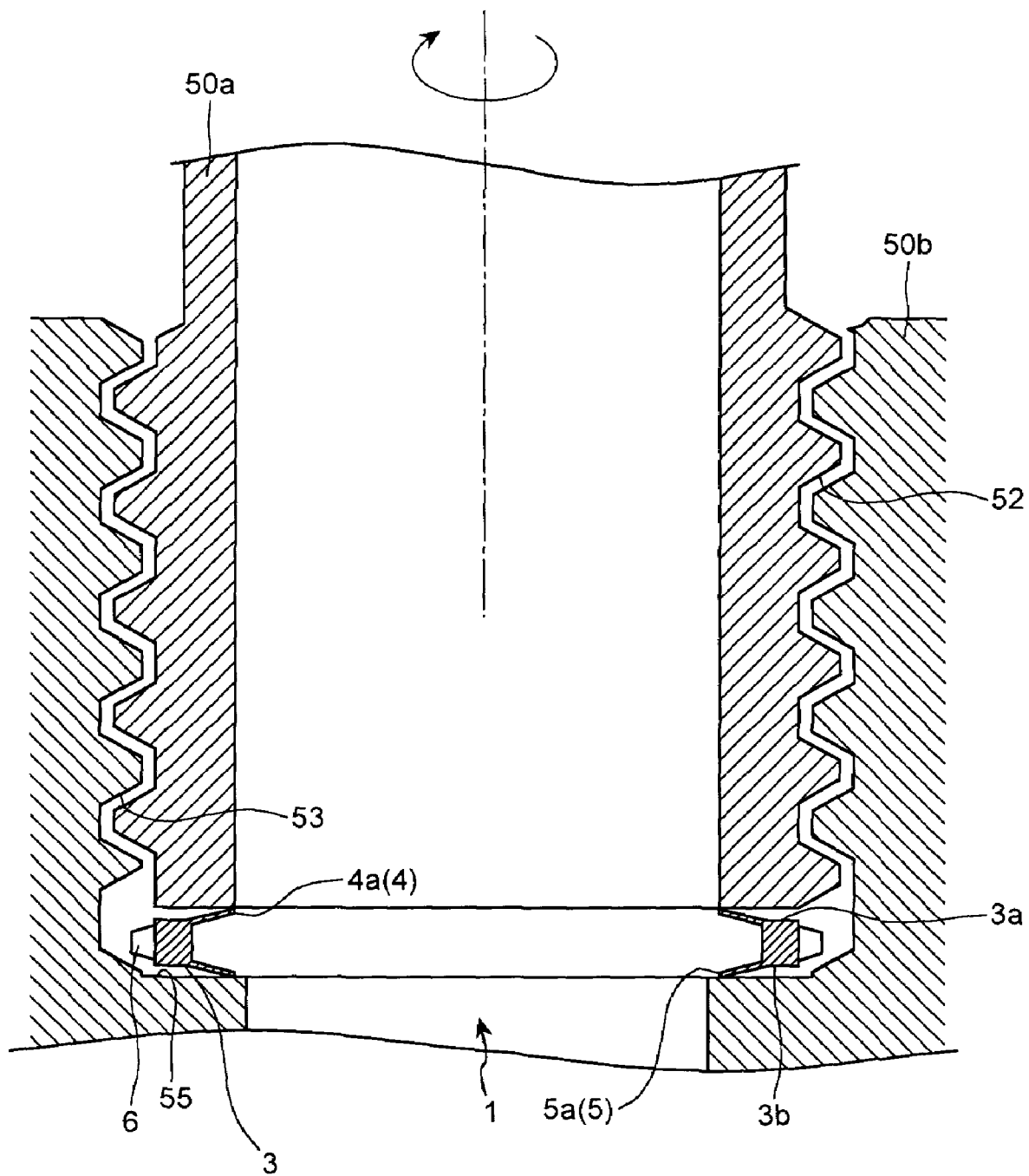

METAL PACKING

TECHNICAL FIELD

The present invention relates to a metallic packing that is suitably used in places where an elastic packing can not be used.

BACKGROUND ART

Generally, metallic or rubber seals are used when connecting pipes. A rubber seal can not be used to connect pipes that conduct steam since the steam is hot and damages the rubber seal. Therefore, when connecting pipes that conduct hot material, conventionally, an annular shaped metallic packing (C-ring seal) having a C-shaped cross-section, or a C-ring seal that contains metallic spring and like were used.

An example of a metallic packing has been disclosed in Japanese Patent Application Laid-Open No. 11-101346. The annular metallic packing disclosed in this publication has an open groove that extends till the end of inner surface. This metallic packing is formed to extend a free end of inner side (open groove) in tangent line direction of outside bending part. A metallic packing with better sealing property has been disclosed in Japanese Patent Application Laid-Open No. 7-55004. The metallic packing described in this publication is O-ring seal. There is a metallic spring inside this O-ring seal and, an annular jacket that completely covers the spring.

However, the prior art metallic packings have following problems. Even if the metallic packing is used as a single body, it is difficult to determine to what extent the pipes may be tightly screwed. If the pipes are tightened too much, the elastic limit of the metallic packing may be crossed and the metallic packing may get damaged. If the metallic packing gets damaged, it looses the elasticity and does not serve the purpose. Moreover, depending on the amount of deformation of the metallic packing, it can not be removed from its place and may even damage the pipes. There is a problem with the O-ring seal with the metallic spring inside that the production cost is high.

It is an object of the present invention to provide a metallic packing having lower production cost as well as having a good sealing ability, installation ability, and high flexibility in design.

DISCLOSURE OF THE INVENTION

The metallic packing according to the present invention includes an annular basement having an opening through which holes of the hollow members are connected to each other; and two annular lips that project from inner or outer circumference of the annular basement to inner or outer side, each annular lip steps away from the other lip as both lips recede from the annular basement, and a distance between both free ends is longer than a length of the annular basement along a central axis of the opening.

BRIEF DESCRIPTION OF THE DRAWINGS

FIG. 2 is a perspective view of the metallic packing shown in FIG. 1, FIG. 3 is a cross-sectional view taken along the line III—III shown in FIG. 2, FIG. 4 is a cross-sectional view that explains installation of the metallic packing.

BEST MODE FOR CARRYING OUT THE INVENTION

Exemplary embodiments of the metallic packing according to the present invention will be described in detail with reference to the accompanying drawings.

Figure 1:
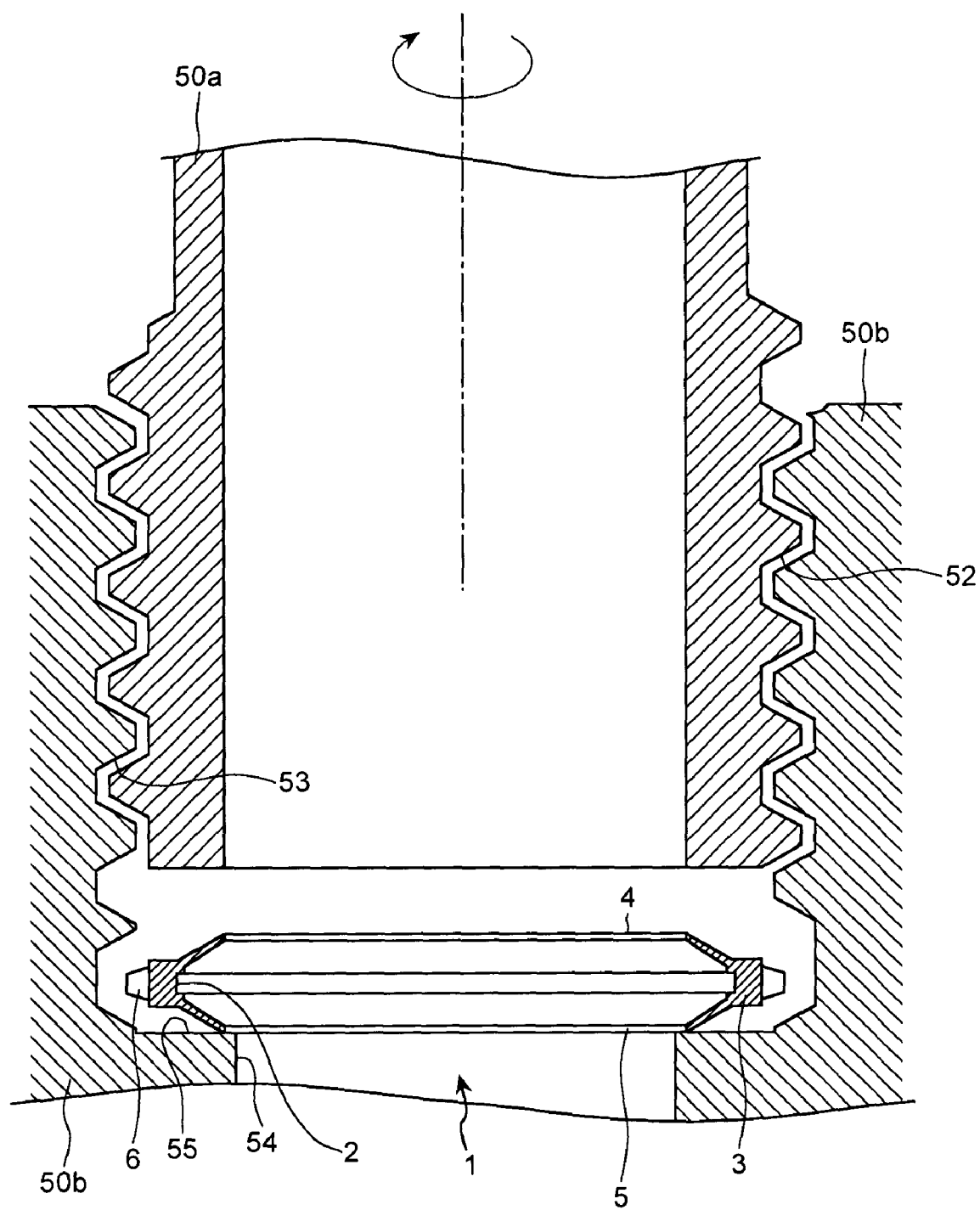
FIG. 1 is a cross-sectional view that shows how a metallic packing of the present invention is used.

FIG. 1 is a cross-sectional view that shows how the metallic packing of the present invention is used. Basically the metallic packing 1 is used to air-tightly connect two pipes. This metallic packing 1 is used at places where a rubber seal can not be used because of high temperature of the material flowing through the pipes. It is assumed here that steam pipes 50a and 50b, through which high temperature steam flows, are to be connected to each other through the metallic packing 1. The steam pipe 50a has a hole 51 and a male screw 52. The male screw 52 is formed on the outer circumference of the steam pipe 50a. The steam pipe 50b has a taper hole 54 and a female screw 53. The female screw 53, which corresponds to the male screw 52 of the steam pipe 50a, is formed on an inner circumference of the steam pipe 50b. The steam pipe 50b has a taper hole 54. The diameter of taper hole 54 is smaller than the diameter of the female screw 53. As a result, a shoulder 55 is formed in the steam pipe 50b between the taper hole 54 and the female screw 53.

The metallic packing 1 is positioned between the tip of the steam pipe 50a and the shoulder 55 of the steam pipe 50b. As shown in FIG. 2, the metallic packing 1 is circular and has a basement 3 with an opening 2. The hole 51 of the steam pipe 50a is connected to the taper hole 54 of the steam pipe 50b through the opening 2. As shown in FIG. 3, the cross-section of the basement 3 is rectangular and the basement 3 has a top surface 3a and a bottom surface 3b that are parallel to each other and flat.

The inner circumference of the annular basement 3 has a pair of annular lips 4 and 5. These lips 4 and 5 project in the direction of the central axis of the opening 2. The lip 4 projects upward and the lip 5 projects downward. Thus, the lips 4 and 5 project away from each other. The distance H between the tips of the respective lips 4 and 5 is made longer than the thickness D of the basement 3. In other words, the lips 4 and 5 project from the basement 3 towards the axis of the opening 2 in the form of roman character V when seen in any specific cross-section of the metallic packing 1.

A plurality of projections 6 are provided on the outer circumference of the basement 3. As an example, FIG. 3 shows that two projection 6 are provided at positions that are opposite with respect to the central axis of the opening 2. Shapes and sizes of the projections 6 are such that the projections 6 get engaged (e.g., can be screwed up) with the female screw 53 of the steam pipe 50b.

The metallic packing 1 can be formed by cutting a metallic disk P, like the one shown in broken line in FIG. 3, using a lathe. Thus, the basement 3, lips 4 and 5, and the projections 6 can be formed easily and speedily by cutting the metallic disc. As a result, the metallic packing 1 can be produced at lower cost and it has better design flexibility.

The projections 6 may also be formed by welding metallic pins to the surface of the basement 3 instead of cutting the projections 6 from the metallic disc.

When joining the steam pipes 50a and 50b, the metallic packing 1 is inserted in the steam pipe 50b such that the projections 6 are engaged with the female screw 53 of the steam pipe 50b. Then, the metallic packing 1 is rotated inside the steam pipe 50b till it rests on the shoulder 55. Since the metallic packing 1 has projections 6, it can be screwed in the female screw 53 of the steam pipe 50b and can be easily and speedily installed at the right place.

As already explained, the distance H between the free ends 4a and 5a of the lips 4 and 5 is longer than the thickness D of the basement 3. As a result, when the metallic packing 1 rests on the shoulder 55, the free end 5a of the lip 5 will touch the shoulder 55 but the bottom surface 3b of the basement 3 will not touch the shoulder 55. Once the metallic packing 1 is installed in this manner, the steam pipe 50a is screwed in the steam pipe 50b.

FIG. 4 shows a situation in which the steam pipe 50a is screwed in the steam pipe 50b. Since the distance H between the free ends 4a and 5a of the lips 4 and 5 is longer than the thickness D of the basement 3, the tip of the steam pipe 50a will first touch the free end 4a of the annular lips 4 rather than the upper surface 3a of the basement 3.

If the steam pipes 50a and 50b are tightened further, the lips 4 and 5 get pressed by the pressure from the steam pipes 50a and 50b and bent towards each other elastically. The resilience generated due to the deformation of the lips 4 and 5 exerts a stress at the place of contact of the free ends 4a and 5a of the lips 4 and 5 and the steam pipes 50a and 50b. Therefore, the metallic packing 1 provides excellent sealing property even if the steam pipes 50a and 50b are not screwed tightly.

Figure 5:
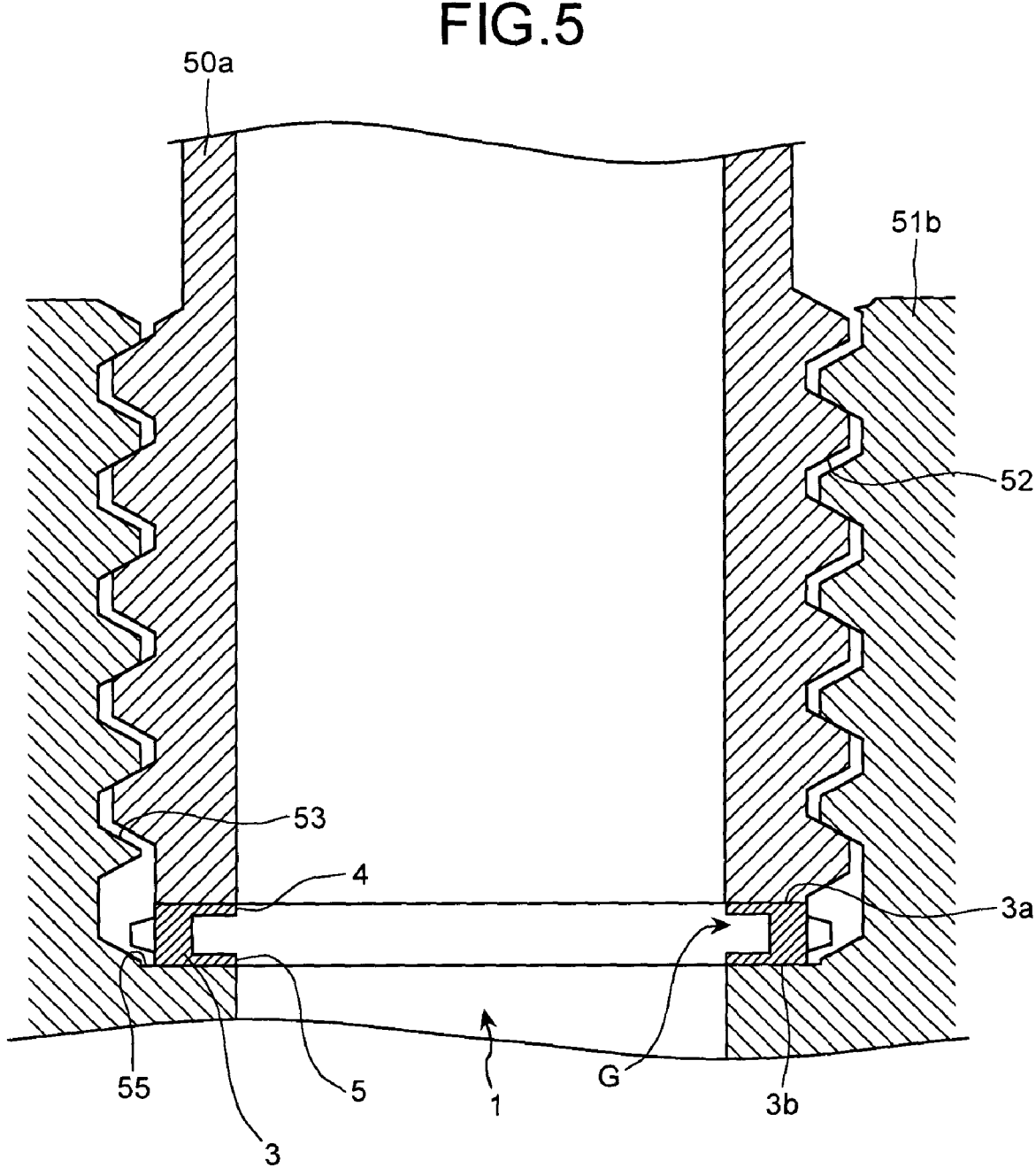
FIG. 5 is a cross-sectional view that explains installation of the metallic packing.

As seen from FIG. 5, the screwing of the steam pipe 50a is stopped when the tip of the steam pipe 50a touches to the upper surface 3a of the annular basement 3, and the upper surface of the shoulder 55 of the steam pipe 50b touches the bottom surface 3b of the annular basement 3. That means, the distance (thickness) D determines the extent to tighten the steam pipes 50a and 50b when the metallic packing 1 is applied. As a result, the metallic packing 1 is perfectly prevented from plastic deformation caused by the excessive tightening of the steam pipes 50a and 50b. A primary repulsion or installing condition of the metallic packing is still kept for reinstalling the metallic packing 1.

When the tip of the steam pipe 50a touches to the upper surface 3a of the annular basement 3, and the upper surface of the shoulder 55 touches to the bottom surface 3b, the shoulder 55 and the upper surface of the lip 5, and the tip of the steam pipe 50a and the upper surface of the lip 4 contact each other tightly. In addition, when steam (fluid) is passed through the holes 51 and 54 of the respective steam pipes 50a and 50b, steam also enters into a space G between the lips 4 and 5 and pushes the lips 4 and 5 towards the respective steam pipes 50a and 50b. As a result of this pushing, the metallic packing 1 provides excellent sealing property between the steam pipes 50a and 50b.

Figure 6:
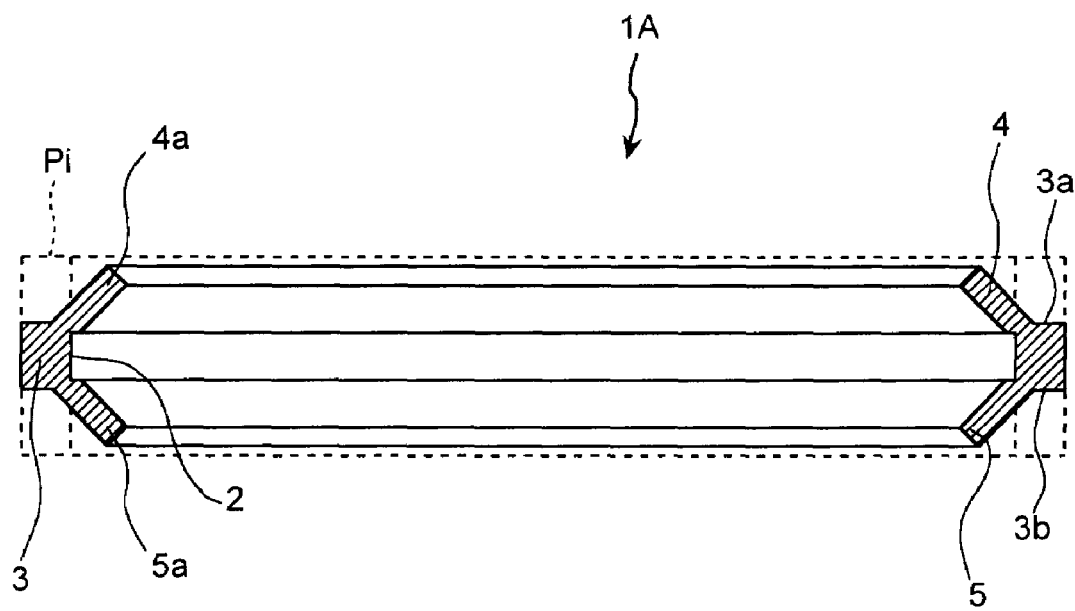
FIG. 6 is a cross-sectional view that shows an alteration of the metallic packing.

FIG. 6 shows an alteration in the metallic packing according to the present invention. A metallic packing 1A in the diagram is formed by cross cutting a metallic tube as shown in broken line of the figure and making a member Pi, plastic forming inner circumference of the member Pi, and bending the annular lip 4 and 5. It is favorable to cut or heat-treat the member Pi accordingly to make the annular lip 4 and 5 in desired shape. Even the metallic packing 1A has better flexibility in design, it can be produced at lower cost, and has excellent sealing ability or installation ability.

Figure 7:
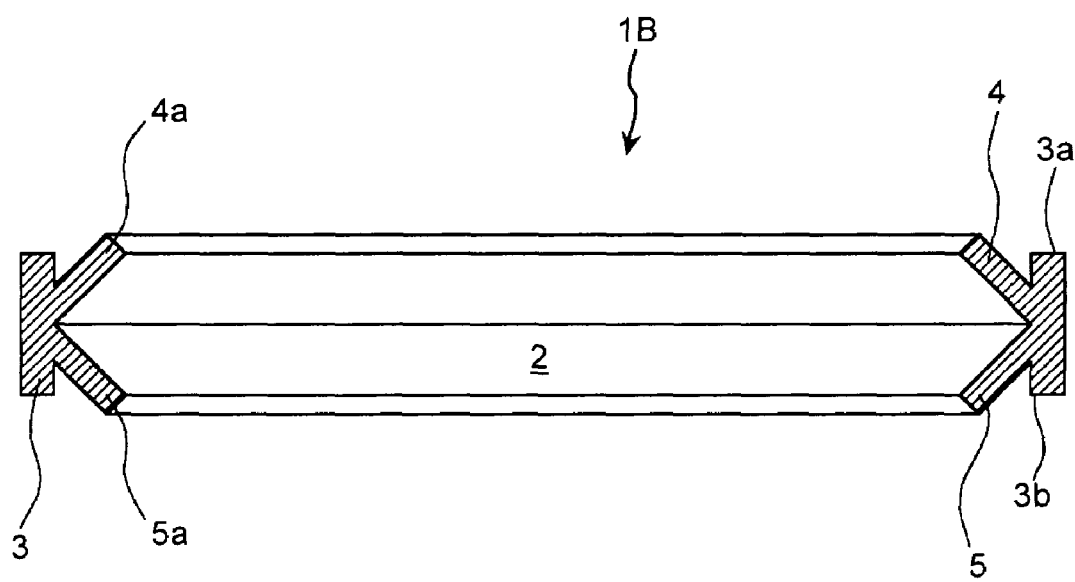
FIG. 7 is a cross-sectional view that shows another alteration of the metallic packing, FIG. 8 a cross-sectional view that shows still another alteration of the metallic packing.
Figure 8:
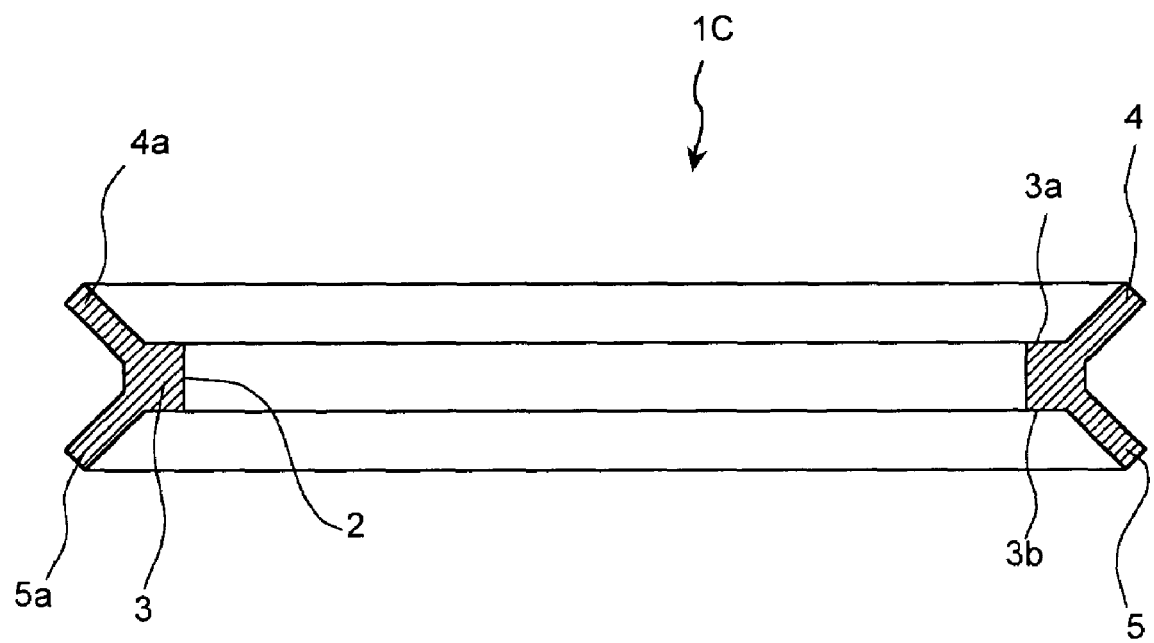

The metallic packing 1 and 1A is described as having the lip 4 projected from top inner circumference of the annular basement 3 and the lip 5 projected from bottom inner edge of the annular basement 3, but it is not only limited to this structure. FIG. 7 shows another alteration in the metallic packing according to the present invention. A metallic packing 1B has the lips 4 and 5 projecting from middle of the inner circumference of the annular basement 3, and gradually steps away from the other lip. In the metallic packing 1, 1A, and 1B, the lips 4 and 5 to project towards the central axis, but it is not only limited to this structure. FIG. 8 shows still another alteration in the metallic packing according to the present invention. As in a metallic packing 1C, the lips 4 and 5 may project away from the central axis.

The metallic packing according to the present invention achieves the effects that are described below. The metallic packing according to the present invention has an annular basement having an opening through which holes of the hollow members are connected to each other; and two annular lips that project from inner or outer circumference of the annular basement to inner or outer side, each annular lip steps away from the other lip as both lips recede from the annular basement, and a distance between both free ends is longer than a length of the annular basement along a central axis of the opening. As the result, the present invention provides a metallic packing that can be produced at lower cost, has a good sealing ability, installation ability, and better flexibility in design.

INDUSTRIAL APPLICABILITY

As has been described, the metallic packing according to the present invention is suitably used in places where an elastic packing can not be used.

The invention claimed is:

1. A metallic packing to be installed between hollow members, comprising:
   an annular base having an opening through which interiors of the hollow members may be connected to each other;
   two annular lips that project from an inner or outer circumference of the annular base to an inner or outer side, wherein
   the annular base has a substantially rectangular cross-section,
   the rectangular cross section of the annular base has two substantially parallel sides which correspond respectively to an outer circumferential surface of the annular base and the inner circumferential surface of the annular base,
   the two annular lips are constant in thickness, have a base and a free end, and extend inwardly and transversely with respect to a central axis of the opening from both sides of the inner circumferential surface of the annular base,
   the two annular lips recede from each other as the two annular lips recede from the annular base, and a distance between free ends of the annular lips is longer than a length of the annular base along a central axis of the opening when the metallic packing is not compressed between the hollow members,
   the two annular lips are bent elastically at the base, and the distance between the free ends of the annular lips is equal to the length of the annular base along the central axis of the opening when the metallic packing is compressed between the hollow members, and the annular base has two projections provided on the outer circumferential surface thereof, the two projections being disposed symmetrically with respect to the central axis of the opening on the outer circumferential surface.

2. The metallic packing according to claim 1, wherein the metallic packing is manufactured by cutting a metal disk.

3. The metallic packing according to claim 1, wherein the metallic packing is manufactured by cutting a metallic tube perpendicular to a central axis of the metallic tube into pieces and metal forming an inner or outer circumference of each piece.

4. The metallic packing according to claim 1, wherein each of the two projections comprises a metallic pin welded to a surface of the annular base.

5. The metallic packing according to claim 1, wherein the two projections are engageable with a female screw in one of the hollow members.

* * * * *